Jan. 26, 1937.  H. J. CRINER  2,068,733
SLICING MACHINE
Filed Feb. 18, 1935  2 Sheets-Sheet 1
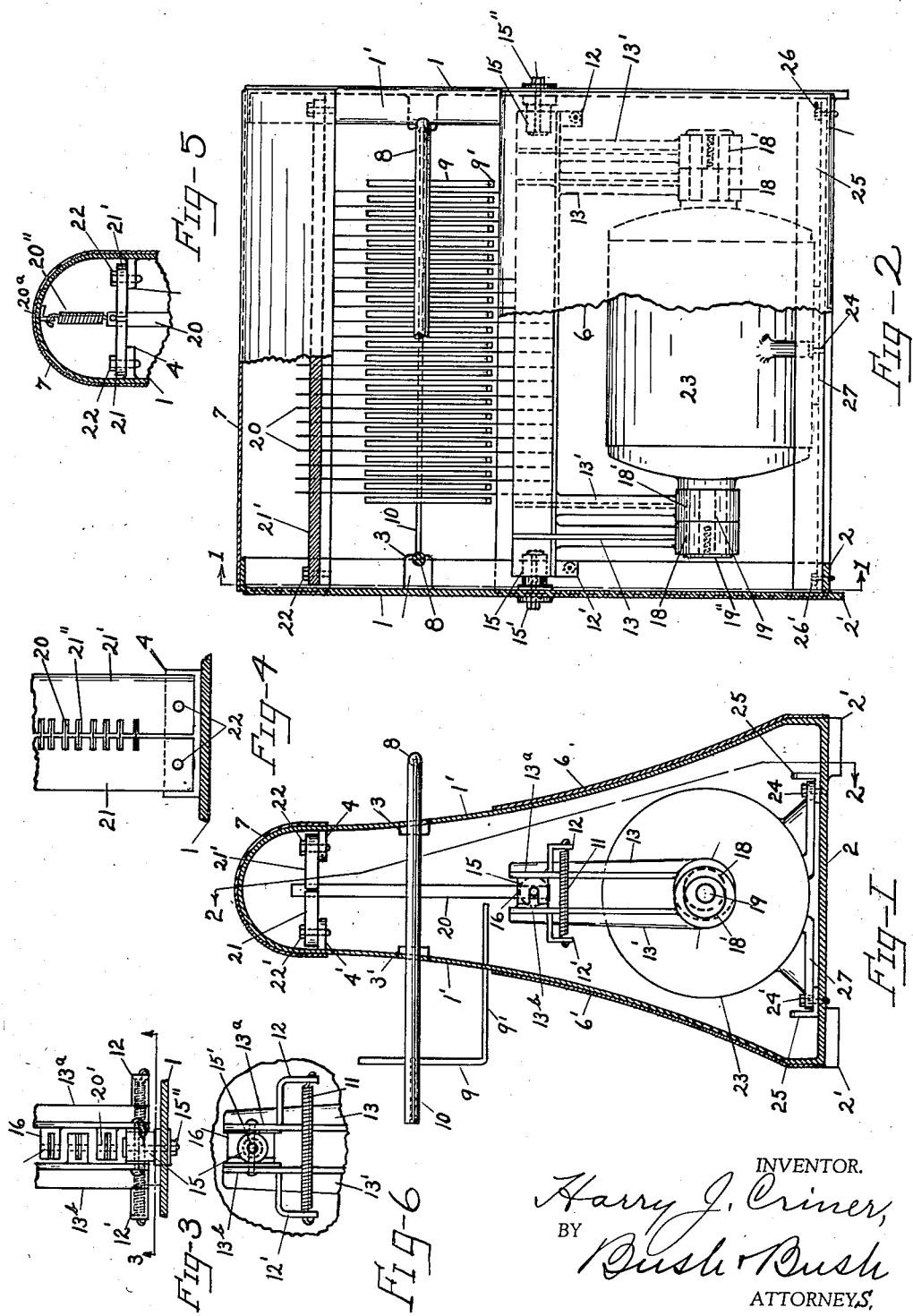
INVENTOR.
Harry J. Criner,
BY Bush & Bush
ATTORNEYS.

Jan. 26, 1937. H. J. CRINER 2,068,733
SLICING MACHINE
Filed Feb. 18, 1935 2 Sheets-Sheet 2
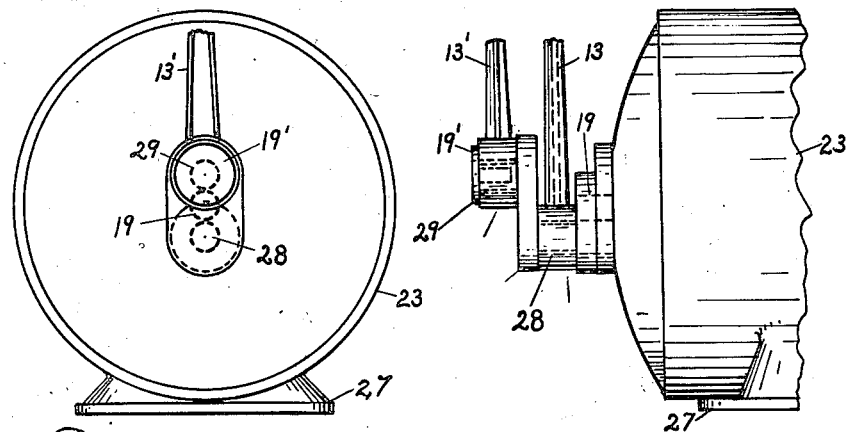
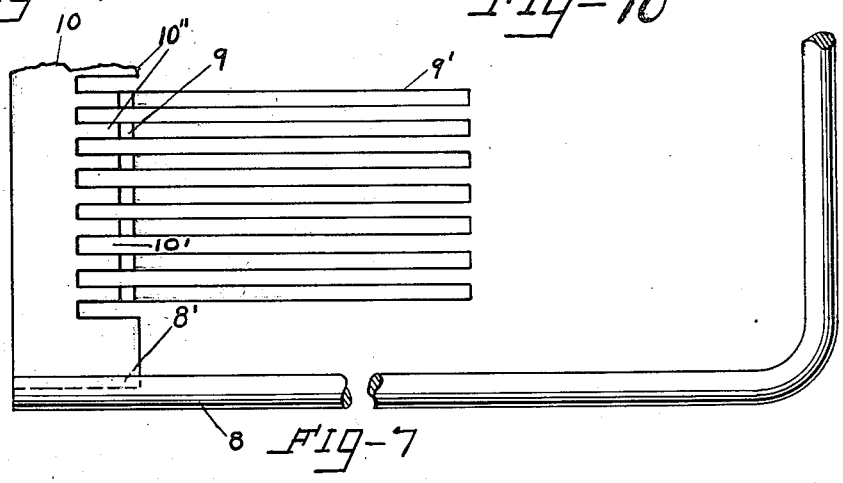
INVENTOR.
Harry J. Criner,
BY
Bush + Bush,
ATTORNEYS.

Patented Jan. 26, 1937

2,068,733

UNITED STATES PATENT OFFICE 2,068,733

SLICING MACHINE

Harry J. Criner, Davenport, Iowa, assignor of one-half to A. G. Bush, Davenport, Iowa Application February 18, 1935, Serial No. 7,003

9 Claims. (Cl. 146—153)

My invention relates to improvements in bread slicing machines and the objects of my invention are:

1. To provide a simple, light, economical slicing machine of small size adapted for use in stores, hotels and homes, as an article of manufacture;

2. To provide a slicing machine of superior simplicity with feeding means especially adapted for the slicing of single loaves.

I attain these objects by the means illustrated in the accompanying drawings, in which,—

Figure 1 is a sectional elevation of my machine on the line 1—1 of Figure 2;

Figure 2 is a rear elevation of my machine on the line 2—2 of Figure 1;

Figure 3 is an enlarged detail showing the arrangement of the lugs upon the crossbars and the roll guides for the crossbars;

Figure 4 is an enlarged plan view of the guide plate;

Figure 5 is a sectional detail of a form of resilient connection for the upper ends of the blades;

Figure 6 is an enlarged detail end view of the crosshead arms and connecting spring;

Figure 7 is an enlarged detail plan view of a portion of the feeder;

Figure 8 is an elevation of the portion of the feeder shown in Figure 7; and

Figures 9 and 10 are enlarged details of an alternate form of driving mechanism for the crossbars.

Similar numerals refer to similar parts throughout the several views.

My apparatus comprises a pair of side plates, 1, having inwardly extending flanges, 1', formed at the front and rear edges thereof.

For convenience, I refer to the right of the machine as shown in Figure 1 as the rear and the left of it as shown in that figure as the front.

A plate of sheet iron or other suitable material is spot-welded or otherwise suitably secured to the flanges, 1', of the side plates, 1, at the rear of the machine extending upwardly to approximately the cutting level. A similar plate, 6', is attached to flanges of the side plates, at the front thereof and extends upwardly to the same height as the rear plate.

Flanges or ribs, 2, are formed upon the side plates, 1, near the bottom thereof and to these side plates transverse angleirons, 25, are bolted or otherwise suitably secured. On the angleirons, 25, is seated an electric motor housing, 23, the feet, 27, of which are secured to the angleirons by set screws, 24 and 24'.

Both ends of the motor shaft, 19, are extended outwardly through the housing and upon the motor shaft cams, 18 and 18', are mounted. These cams may be united to the shaft or formed integral therewith as desired. Upon the cams, 18 and 18', I mount the hubs of the arms, 13 and 13', which extend upwardly therefrom.

The upper ends of the arms, 13, are united by a transverse crosshead, 13a, and the upper ends of the arms, 13', are united by a transverse crosshead, 13b. The crossheads may be cast integral with the arms or secured thereto in any suitable manner. The crossheads are formed with alternating lugs, 16, which extend inwardly therefrom. The lugs, 16, are provided with slots to receive the cutting blades, 20, and the lower ends of the cutting blades, 20, are secured in their respective lugs by pins, 20', or other suitable means.

The upper ends of the blades, 20, extend vertically upward in a common plane and pass through openings or slots, 21'', which are formed in the guide plates, 21 and 21'. The guide plates, 21 and 21', extend transversely of the machine and their ends are bolted or otherwise suitably secured to lugs, 4 and 4', cast integral with the side plates, by set screws, 22 and 22'.

For ordinary purposes, it will not be necessary to attach any springs or driving means to the upper ends of the blades, 20, as the blades can be made of sufficient width and thickness to stand up under ordinary use, but when the machine is intended to be used for heavy duty, I prefer to attach springs, 20'', to the upper ends of the blades, 20, and the upper ends of these springs may be hooked to an angleiron, 20, and united to the top of the housing.

In order to secure the movement of the cutting blades in a vertical plane, I attach to or form integral with the crossheads, 13a and 13b, at each end thereof, arms or fingers, 12 and 12', and mount upon said arms or fingers tension springs, 11, which act continuously to draw the crossheads, 13a and 13b, toward each other.

To facilitate vertical movement of these crossheads, I mount rolls, 15, upon stub shafts or bolts, 15', which are secured to the side frames, 1 and 1', by nuts, 15''.

The rolls, 15, are preferably made of oilless bearing material so as to avoid the necessity of oil lubrication.

At the opposite ends of the crossheads, 13a and 13b, flat bearing faces are provided which contact with the rolls, 15, and as the crossheads travel in opposite directions, the rolls, 15, facilitate the movement thereof and act as guides.

The bearing faces of the crossheads, 13a and 13b, may be curved in order to prevent any lateral movement thereof, but I prefer to use the flat faces as shown because the vertical travel of the crossheads will be so small that any lateral movement thereof will be negligible and will not interfere substantially with the cutting operation of the blades.

It is obvious that the driving movement of the connecting rods may be accomplished either by the cams shown in Figure 1 or by the use of cranks, 28 and 29, as illustrated in Figures 9 and 10 and when cranks are utilized, the connecting rod, 13, may be held in place by a set screw, 19'. A similar set screw, with enlarged head, 19'', may be utilized to retain the connecting rod, 13, upon its cam as shown in Figure 2.

In order to support the bread while being sliced, I form supporting lugs, 3, upon the inner faces of the side plates or frames, 1, having tubular recesses formed therein in which the rod, 8, is formed substantially in U-shape and the front ends of it are slotted at 8' to receive the ends of the crossbar or plate, 10, which is preferably spot-welded at 8' to the rod, 8, at each end of the crossbar, 10.

The crossbar, 10, is formed with slots, 10', extending into it from the rear edge and leaving fingers, 10'', extending rearwardly therefrom.

To the outer end of the fingers, 10'', I unite by spot-welding or other suitable means, L-shaped rods, 9, which extend vertically at right angles to the plate, 10. The lower ends, 9', of the rods, 9, are bent to the rear at a right angle to the vertical part thereof and form a support for a loaf of bread while being sliced.

The rod, 8, is so proportioned that the rear end will extend to the rear of the cutting machine far enough to afford an easy hold for the hand of the operator when the loaf of bread is being placed upon the extensions, 9'. It will be understood that the rods, 9 and 9', are spaced so as to pass readily between the cutting blades. When a loaf of bread is placed upon the rods, 9 and 9', the rod, 8, is manually pulled to the rear and the motor started. The bread will then be carried forward to and through the cutting blades, the openings, 10', being deeper than the width of the blades, so as to permit the bread to be pushed entirely through the blades. The bread can then be manually lifted from its support upon the rod extensions, 9', and removed and the carrier manually returned to its charging position.

It should be noticed that the construction described of front and rear crossheads or crossbars and links formed integral therewith, may be cast from the same pattern and will be interchangeable.

This method of production will cause the front and rear crossheads, with their integral arms, to be well balanced and a very little filing or grinding can produce perfectly balanced crosshead and arm assemblies.

I claim:

1. In a bread slicing machine comprising a housing having side plates, a plurality of slicing blades mounted therein, a plurality of supporting lugs united to the side plates at opposite sides of the housing each having a longitudinal groove formed therein, a pair of rods slidingly mounted in said grooves on opposite sides of the machine, a handle uniting said rods at one end thereof and a slotted crossbar uniting said rods at the opposite end, said crossbars being provided with fingers intermediate the slots, a correspondingly plurality of L-shaped rods having vertical arms united to said fingers and horizontal arms adapted to form a support for a loaf of bread, said supporting rods and fingers being adapted to pass between the cutting blades while the bread is being sliced and to carry the bread entirely past the blades.

2. In a bread slicing machine comprising a housing having side plates, a plurality of slicing blades mounted therein, supporting lugs united to the side plates at opposite sides of the housing each having a longitudinal groove formed therein, a pair of rods slidingly mounted in said grooves on opposite sides of the machine, a handle uniting said rods at one end thereof and a slotted crossbar uniting said rods at the opposite end, said crossbars being provided with fingers intermediate the slots, a correspondingly plurality of L-shaped rods having vertical arms united to said fingers and horizontal arms adapted to form a support for a loaf of bread, said supporting rods and fingers being adapted to pass between the cutting blades while the bread is being sliced and to carry the bread entirely past the blades.

3. A bread slicing machine comprising a housing having side plates with front and rear end plates united thereto and a top plate spaced from the front and rear plates, a transverse motor detachably mounted in the lower part of the housing with its shaft extending outwardly at each end of the motor, alternating cams mounted upon the ends of the shaft in opposed pairs, a front crossbar mounted above the motor upon fixed arms united to the crossbar and depending from the ends thereof, the lower ends of which arms carry suitable bearings revolvably mounted upon one pair of the cams, a rear crossbar similarly mounted upon the opposite pair of cams and balanced with the front crossbar and its arms, alternating series of inwardly projecting lugs united to the respective crossbars, cutting blades having their lower ends pivotally mounted in the lugs respectively and extending upwardly therefrom, front and rear guide plates secured in the upper part of the housing having slots therein adapted to receive and guide the upper ends of the cutting blades, and guides bearing against the crossbars to cause the blades to travel in a single plane when driven by the motor, the motor, crossbars and blades being readily removable as a unit without disturbing the guide plates.

4. A bread slicing machine comprising a housing, a transverse motor detachably mounted in the lower part of the housing with the motor shaft extending outwardly at both ends of the motor, alternating cams mounted upon the ends of the shaft in opposed pairs, interchangeable balanced U-shaped frames mounted upon the respective pairs of cams, alternating series of lugs united to the respective U-shaped frames in a single plane, cutting blades having their lower ends pivotally mounted in the lugs respectively and extending upwardly therefrom in a common plane, means secured in the upper part of the housing adapted to receive and guide the upper ends of the cutting blades, bearing faces formed upon the inner sides of the U-shaped frames, and guides mounted upon the housing adapted to bear upon the bearing faces of the U-shaped frames and cause the blades to travel in a single plane when driven by the motor, the motor, U- shaped frames and blades being removable or interchangeable as a unit without removing the guiding means from the upper part of the housing.

5. In a bread slicing machine having a housing, a detachable and interchangeable slicing unit comprising a transverse motor with the motor shaft extending outwardly at both ends of the motor, a pair of interchangeable, balanced U-shaped frames, alternating series of lugs united to the U-shaped frames in a single plane, cutting blades having their lower ends pivotally mounted in the lugs respectively and extending upwardly therefrom in a common plane, blade-guiding means secured in the upper part of the housing to guide the upper ends of the blades, means united to the housing adapted to co-act with the U-shaped frames and cause all of the blades to travel in a single plane when driven by the motor, means mounted upon the motor shaft to reciprocate the U-shaped frames in alternation, said motor, U-shaped frames and blades being removable and interchangeable as a unit without disturbing or removing the blade guides in the upper part of the frame.

6. In a bread slicing machine having a housing, a detachable and interchangeable slicing unit comprising a transverse motor with the motor shaft extending outwardly at both ends of the motor, a pair of interchangeable, balanced U-shaped frames in a single plane, cutting blades having their lower ends pivotally mounted in the lugs respectively and extending upwardly therefrom in a common plane, blade-guiding means secured in the upper part of the housing to guide the upper ends of the blades, means united to the housing adapted to co-act with the U-shaped frames and cause all of the blades to travel in a single plane when driven by the motor, means mounted upon the motor shaft to reciprocate the U-shaped frames in alternation, said motor, U-shaped frames and blades being removable and interchangeable as a unit without disturbing or removing the blade guides in the upper part of the frame, and without disturbing or removing the co-acting means.

7. In a bread slicing machine having a housing, a detachable and interchangeable slicing unit comprising a transverse motor with the motor shaft extending outwardly at both ends of the motor, a pair of interchangeable, balanced U-shaped frames, alternating series of lugs united to the U-shaped frames in a single plane, cutting blades having their lower ends pivotally mounted in the lugs respectively and extending upwardly therefrom in a common plane, blade-guiding means secured in the upper part of the housing to guide the upper ends of the blades, rotatable means pivotally united to the housing adapted to co-act with the U-shaped frames and cause all of the blades to travel in a single plane when driven by the motor, means mounted upon the motor shaft to reciprocate the U-shaped frames in alternation, said motor, U-shaped frames and blades being removable and interchangeable as a unit without disturbing or removing the blade guides in the upper part of the frame.

8. In a bread slicing machine, a casing having an access opening, a cutting device including a motor and a cutting mechanism supported and carried solely by said motor, and means removably securing the cutting device within said casing, said opening being of sufficient size to permit removal from the casing of the motor and cutting mechanism as a unit.

9. In a bread slicing machine, a casing having an access opening, a cutting device including a motor and a cutting mechanism supported and carried solely by said motor, means removably securing the cutting device within said casing, said opening being of sufficient size to permit removal from the casing of the motor and cutting mechanism as a unit, and guide means within said casing supporting the cutting device in an upright position.

HARRY J. CRINER.